(12) United States Patent
Brumberger et al.

(10) Patent No.: US 7,147,221 B2
(45) Date of Patent: Dec. 12, 2006

(54) ROTATIONAL CABLE SHORTENING DEVICE

(75) Inventors: Jesse J. Brumberger, Macedon, NY (US); James Markovitz, Penfield, NY (US); Richard J. Milillo, Fairport, NY (US); Joseph P. Cavalieri, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/113,618

(22) Filed: Apr. 25, 2005

(65) Prior Publication Data

US 2005/0204853 A1  Sep. 22, 2005

Related U.S. Application Data

(62) Division of application No. 10/321,964, filed on Dec. 17, 2002, now Pat. No. 7,028,580.

(51) Int. Cl.
    *B65H 31/26* (2006.01)
(52) U.S. Cl. ..................... 271/220; 271/221
(58) Field of Classification Search ........... 271/220, 271/221, 222; 270/58.12, 58.27; 385/136; 242/388.5, 376, 388.1, 378.4; 74/505, 506; 180/170; 399/195; 199/408; 24/134 P
    See application file for complete search history.

(56) References Cited

U.S. PATENT DOCUMENTS

| 3,474,985 | A | * | 10/1969 | Brudi et al. | |
| 4,304,485 | A | * | 12/1981 | Povio | |
| 4,538,903 | A | * | 9/1985 | Lane | |
| 4,556,211 | A | * | 12/1985 | Carr | |
| 5,511,443 | A | * | 4/1996 | Munekhoff | |
| 5,687,297 | A | | 11/1997 | Coonan et al. | 395/102 |
| 5,779,175 | A | * | 7/1998 | Shirahase | |
| 6,069,624 | A | | 5/2000 | Dash et al. | 345/333 |
| 6,349,893 | B1 | * | 2/2002 | Daoud | |
| 6,511,009 | B1 | * | 1/2003 | Harrison et al. | |
| 6,640,041 | B1 | * | 10/2003 | Ichinari et al. | |
| 6,668,958 | B1 | * | 12/2003 | Hsu | |
| 6,698,573 | B1 | * | 3/2004 | Gienger | 198/456 |
| 6,705,179 | B1 | * | 3/2004 | Mohtasham | 74/505 |
| 2001/0054791 | A1 | * | 12/2001 | Goldbeck et al. | |
| 2003/0080499 | A1 | * | 5/2003 | Yap | |
| 2004/0113357 | A1 | * | 6/2004 | Brumberger et al. | |

* cited by examiner

*Primary Examiner*—David H. Bollinger
(74) *Attorney, Agent, or Firm*—Oliff & Berridge, PLC

(57) ABSTRACT

A rotational cable shortening system for shortening the effective length of a cable by bending a section of the cable. The shortening system comprises a rotatable bridged channel through which the cable is threaded. Upon rotation of the bridged channel, the cable is deflected and effectively shortened.

13 Claims, 5 Drawing Sheets

ROTATIONAL CABLE SHORTENING DEVICE

RELATED APPLICATIONS

This Application is a restriction-induced Divisional of commonly owned U.S. application Ser. No. 10/321,964 filed Dec. 17, 2002 now U.S. Pat. No. 7,028,580 and entitled "Rotational Cable Shortening Device" and having common inventors.

FIELD OF THE INVENTION

The field of the invention is the art of shortening a cable in order to control or actuate a device connected to the cable. In particular, the invention relates to devices that shift positions and that require rapid actuations wherein the actuating mechanism must operate in confined spaces. More particularly, the invention relates to paper handling systems in finisher systems operating in conjunction with high speed printers or duplicators.

BACKGROUND AND SUMMARY

The use of cables to actuate or control devices attached to the end of the cable is very common. In a typical automobile, cables connected to control levers typically are used to open latches for hoods and trunks as well as to actuate the parking brake. In each of these uses, some form of lever is used to multiply either the force applied to the cable or the distance that the cable is pulled. Each end of the cable is securely fastened to either the actuating lever or the device to be actuated. Neither the control lever nor the actuated device move their respective locations.

A cable actuating system becomes more complicated when either the control lever or the device to be actuated must move, or travel, to adjust to the job being performed. Because of the complications, simple cable actuators are often replaced by motors that directly operate upon the device to be actuated. Motors and their related electronics add cost, however, and are often less durable than simple cable systems. For systems requiring intermittent but rapidly repetitive actuations occuring over the order of tens of milliseconds time, motor assemblies typically have speed limitations. Unless a motor runs idly, thereby wasting energy, motor start-up times typically exceed the required time limitations. Additionally, motors, gears, etc. add mass and occupy space to assemblies that must rapidly move as the device being actuated adjusts positions for different jobs.

In addition to motors, solenoids connected to levers or cables offer a common solution that enables rapid actuation with little extra cost or space. However, a typical low-cost solenoid requiring 1 amp at 36 volts has a throw length approximating only 8 mm. Where greater movement or travel is necessary, levers can be added to multiply the distance moved. However, the force applied by a solenoid is not evenly applied throughout the throw. Specifically, the force applied by a solenoid at the beginning of its throw is substantially less than the force applied as the throw nears completion. The result is that solenoid systems, while rapid, are disadvantaged by either limited throw lengths or unevenly applied force. Additionally, if a solenoid and lever must be added to an assembly that moves, then the extra weight must be accommodated by a larger motor that drives movement of the assembly.

Referring now to prior art FIG. 1, a combination of cables, solenoid, pulley, and lever is shown for a low-cost, repetitively rapid actuation system 10 not benefiting from the present invention. The system contains solenoid 11 with throw plunger 12 that moves in and out as the solenoid is activated. Throw plunger 12 is rotatably fastened to a short arm of lever 13 by dowel pin 19. Lever 13 is pivotally mounted about pin 14 such that downward movement of throw plunger 12 induces the long arm of lever 13 to move a considerably greater distance than the throw distance of throw plunger 12. Attached proximate to the end of the long arm of lever 13 is a cable engaging pulley 15 for engaging cable 16. When solenoid 11 pushes lever 13, then cable engaging pulley 15 pushes upward against cable 16, causing a "V" in the cable and pulling the two ends of the cable together by effectively shortening the cable's end-to-end length. Because of lever 13, the throw movement of cable engaging pulley 15 is much greater than the throw of solenoid throw plunger 12.

Among the shortcomings of the above system are that cable engaging pulley 15 must remain in contact with cable 16 in order to obtain full benefit from the upward thrust caused by lever 13. If the cable itself needs to slide due to repositioning of the device to which it is attached, then friction with engaging pulley 15 may cause rapid and excessive wear upon cable 16. Another shortcoming of the system shown in FIG. 1 is that the force applied as engaging pulley 15 begins to press upon cable 16 is less than the force near the end of its travel. This is a result of the varying force applied by solenoid throw plunger 12. Such weaker force at the beginning of a throw may be problematic in overcoming any friction or other resistance to actuating of the device attached to cable 16.

In applications requiring longer throws and intermittent but repetitively rapid actuations, a system better than the above is desired. One such requirement occurs in paper handling systems in finishers for printers and high speed duplicators. As sheets are fed into a paper tray, a tamper device is desired to tamp the sheets down in order to better position the paper and to minimize the paper stack height. One of the challenges for a paper tamper device is the need to adjust to different substrate sizes. The tamper device must be able to shift positions for various substrate sizes and shift from idle to rapid repetitive motion in a fraction of a second. The repetitive motion may be as fast as one down-and-up actuation every 150 milliseconds. An actuating device capable of such speed and repetition without excessive wear upon a cable and at acceptable weight, cost, and space requirement would be highly desirable.

One aspect of the invention is a cable shortening system for shortening the effective length of a cable having a section extended generally along one direction, comprising: a rotatably mounted bridged channel through which the cable is threaded in a rest orientation along one direction; and a mechanism, coupled to the bridged channel, for rotating the bridged channel; wherein rotation of the bridged channel to a second orientation shortens the effective cable length by deflecting a section of the cable away from the one direction.

A finishing system for finishing substrate sheets, comprising: (a) a substrate tray; (b) a tamper assembly for tamping substrate sheets located in the tray; (c) an actuating cable having a section disposed generally in one direction, said cable being connected to the tamper assembly wherein a pulling force from the cable actuates the tamping of substrate sheets; and (d) a cable shortening subsystem for shortening the effective length of the actuating cable, said subsystem comprising a rotatably mounted bridged channel through which the cable is threaded in a rest orientation generally along the one direction and a mechanism, coupled to the bridged channel, for rotating the bridged channel, wherein rotation of the bridged channel to a second orientation shortens the effective cable length by deflecting a section of the cable away from the one direction, thereby exerting a pulling force upon the tamper assembly.

Yet another aspect of the invention is a process for shortening the effective length of a cable having a section initially disposed along one direction, comprising: (a) rotatably mounting a bridged channel; (b) threading a cable through the bridged channel wherein the cable lies in a rest position along the one direction; (c) rotating the bridged channel to a second orientation wherein the effective length of the cable is shortened by deflecting a section of the cable away from the one direction.

DESCRIPTION

Figure 1:
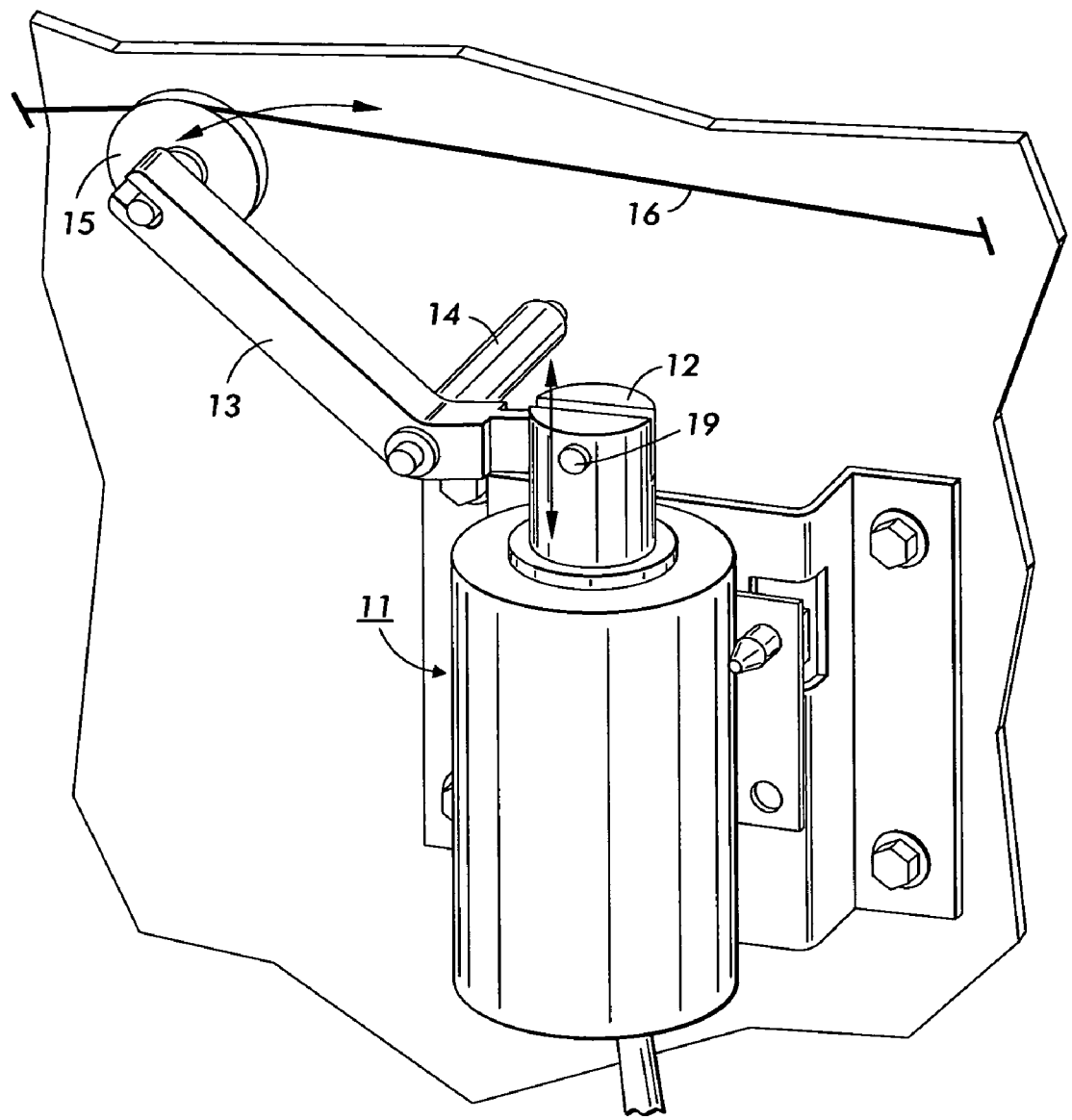
FIG. 1 is an elevated perspective view of a lever and solenoid assembly of the prior art.

For a general understanding of the present invention, reference is made to the drawings. In the drawings, like reference numerals have been used throughout to designate identical elements.

An exemplary system comprising one embodiment of the present invention is a multifunctional printer with print, copy, scan, and fax services. Such multifunctional printers are well known in the art and may comprise print engines based upon ink jet, electrophotography, and other imaging devices. The general principles of electrostatographic imaging are well known to many skilled in the art. The most common form of electrostatographic imaging is electrophotography, which is sometimes referred to as "xerography". Generally, the process of electrophotographic reproduction is initiated by substantially uniformly charging a photoreceptive member, followed by exposing a light image of an original document thereon. Exposing the charged photoreceptive member to a light image discharges a photoconductive surface layer in areas corresponding to non-image areas in the original document, while maintaining the charge on image areas for creating an electrostatic latent image of the original document on the photoreceptive member. This latent image is subsequently developed into a visible image by a process in which a charged developing material is deposited onto the photoconductive surface layer, such that the developing material is attracted to the charged image areas on the photoreceptive member. Thereafter, the developing material is transferred from the photoreceptive member to a copy sheet or some other image support substrate to which the image may be permanently affixed for producing a reproduction of the original document. In a final step in the process, the photoconductive surface layer of the photoreceptive member is cleaned to remove any residual developing material therefrom, in preparation for successive imaging cycles.

The above described electrophotographic reproduction process is well known and is useful for both digital copying and printing as well as for light lens copying from an original. In many of these applications, the process described above operates to form a latent image on an imaging member by discharge of the charge in locations in which photons from a lens, laser, or LED strike the photoreceptor. Such printing processes typically develop toner on the discharged area, known as DAD, or "write black" systems. Light lens generated image systems typically develop toner on the charged areas, known as CAD, or "write white" systems. Embodiments of the present invention apply to both DAD and CAD systems. Since electrophotographic imaging technology is so well known, further description is not necessary. See, for reference, for example, U.S. Pat. No. 6,069,624 issued to Dash, et al. and U.S. Pat. No. 5,687,297 issued to Coonan et al., both of which are hereby incorporated herein by reference.

Finishers attached to the above printer must receive and process cut sheets at the speed of the marking engine. Such speeds now can exceed 200 sheets per minute for electrophotographic printers. For finishers receiving output from certain cut sheet lithographic printers, cut sheet output speeds can be faster than 200 sheets per minute. For collators and finishing equipment receiving sheets from multiple printers or combinations of printers and bins, sheet handling speeds can be even faster.

Figure 2:
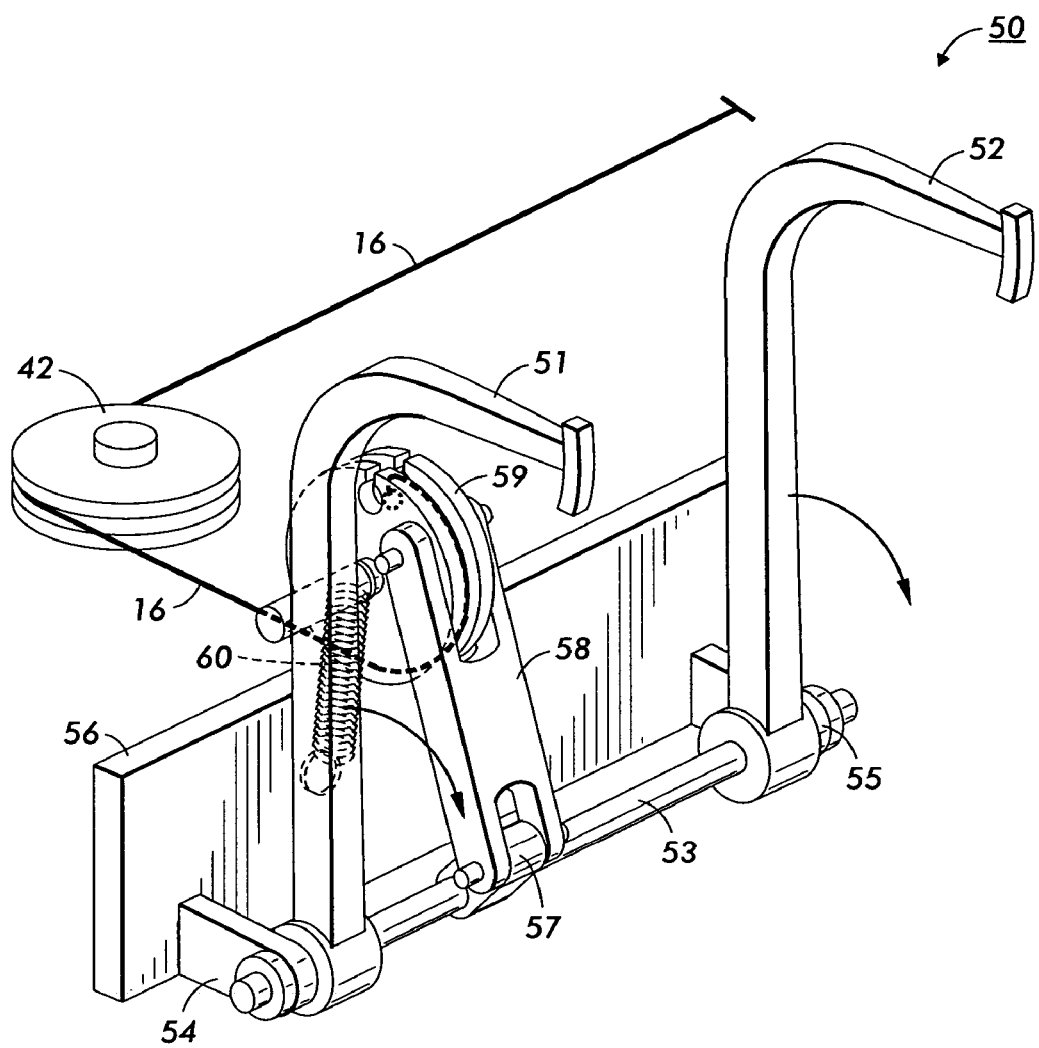
FIG. 2 is an elevated perspective view of an exemplary substrate tamper assembly for a finishing system.

For finishers in which individual sheets are captured in an output tray either as a final destination or as an interim step to further finish processing, it is necessary to align such sheets and to ensure that the stack height is as small as possible. To accomplish both of these tasks, a rapid tamper apparatus 50 similar to that shown in FIG. 2 is often employed. Tamper arms 51 and 52 are fixedly attached to axle 53. Axle 53 is rotatably secured in holding fixtures 54 and 55 which, in turn, are rigidly connected to housing member 56. Returning to axle 53, cam member 57 is rigidly attached to axle 53 and pivotally connected to rod member 58. Rod member 58, in turn, is connected off-center to cam disk 59, which is rotatably mounted onto housing 56. Connected between cam disk 59 and housing 56 is a return spring 60. Lastly, cable 16 connects to cam disk 59 by entering a grooved cable track on the bottom of cam disk 59 and wrapping part way around the front of cam disk 59 until being securely attached near the top of cam disk 59. The result is that when cable 16 is pulled away from cam disk 59, cam disk 59 rotates downward, thereby driving rod member 58 downward also. Since cam member 57 is fixedly mounted off-center to axle 53, downward pressure from rod member 58 causes axle 53 to rotate clockwise as shown by the arrows in FIG. 2. As axle 53 rotates clockwise, tamper arms 51 and 52, which are fixedly mounted to axle 53, are propelled downward to tamp sheets arriving in a tray (not shown) located in front of apparatus 50. Once cable 16 releases its pulling force from cam disk 59, then return spring 60 returns the apparatus to its starting position shown in FIG. 2.

For high speed finishers that contain an apparatus such as tamper apparatus 50, actuations may preferably be as frequent as every 150 to 200 milliseconds, including tamping cycles taking as few as 70 milliseconds to cycle downward from rest to tamp position and then as few as 80 milliseconds for the return. Such rapid tamping action, when coordinated with the arrival with each sheet, serves to settle each sheet and to work each sheet against the sheet stop mechanism in the tray (not shown). The result is an aligned stack of sheets with as little air between the sheets as possible.

If tamper apparatus 50 located in housing 56 were fixedly located within the finisher apparatus, then a simple solenoid-lever actuation system similar to that shown in FIG. 1 that is fixedly attached to an end of cable 16 opposite tamper apparatus 50 would be sufficient. Where apparatus 50 is designed to shift positions in order to accommodate different sizes of sheets in the finisher tray, then the actuation apparatus becomes more complex.

Figure 3:
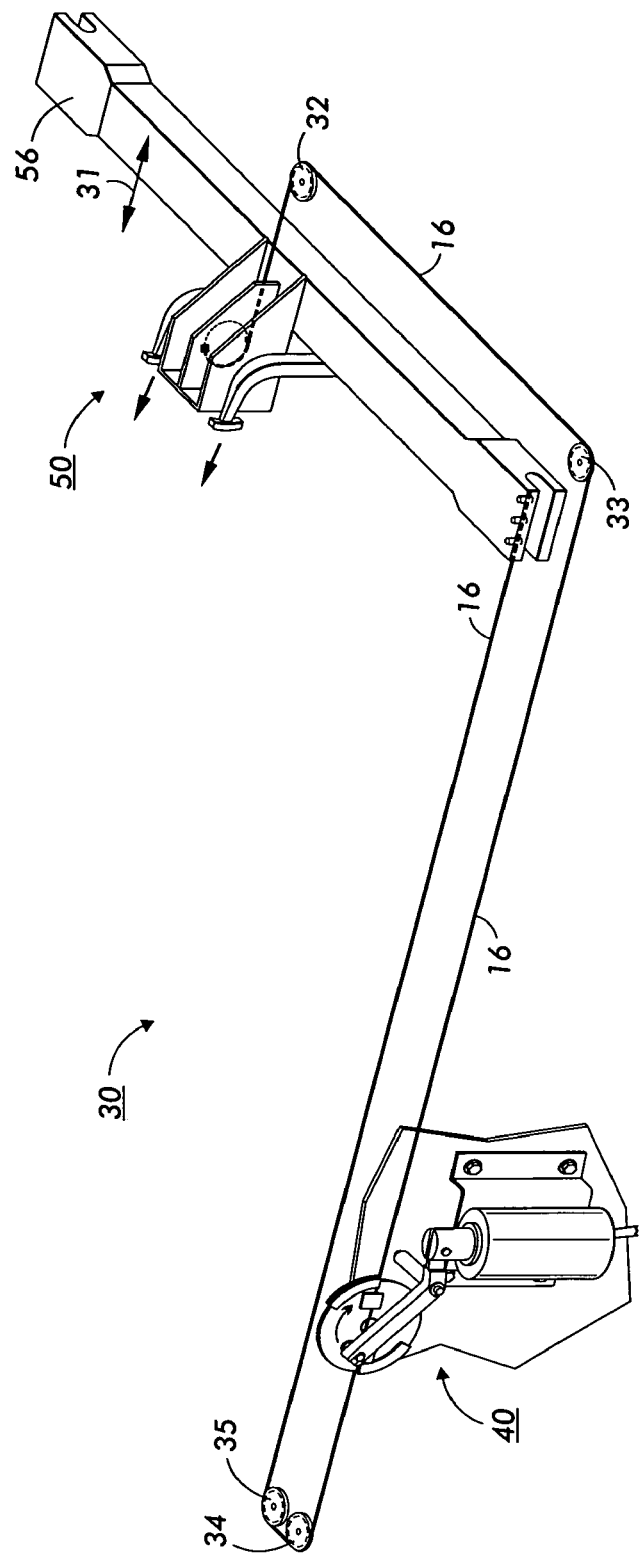
FIG. 3 is an elevated perspective view of a cable actuation system for a tamper assembly using one embodiment of the rotational cable shortening system of the present invention.

With reference to FIG. 3, a tamper assembly 30 of the present invention is shown. Assembly 30 contains a tamper apparatus subsystem 50 which can be tamper apparatus 50 described in relation to FIG. 2. Housing member 56 from FIG. 2 is shown as extended bar 56 in FIG. 3. Housing member 56 is designed to shift positions to accommodate different size sheets entering the tray. This shift may be on the order of 350 mm between positions. Such shifting positions is indicated by dual-headed arrow 31. Cable 16 can be a thin cable of approximately 0.7 mm diameter that threads from tamper apparatus 50 through a series of pulleys 32–35 until one end of cable 16 is fixedly fastened to housing bar 56. The result is that housing bar 56 and cable 16 together form essentially an endless loop. As a drive motor (not shown) shifts housing bar 56 along double headed arrow 31, cable 16 is accordingly pulled around pulleys 32–35. The section of cable 16 in contact with each of pulleys 32–35 also shifts. Such shifts render simple solenoid-lever actuation systems to a fixed end of a cable impracticable. A practicable alternative, therefore, is a cable shortening apparatus. By rapidly shortening and then releasing the cable, the effect upon tamper apparatus 50 will be equivalent to a simple pulling of cable 16 as discussed above in relation to FIG. 2. A cable shortening embodiment of the present invention is accordingly shown in FIG. 3 as apparatus 40.

Figure 4:
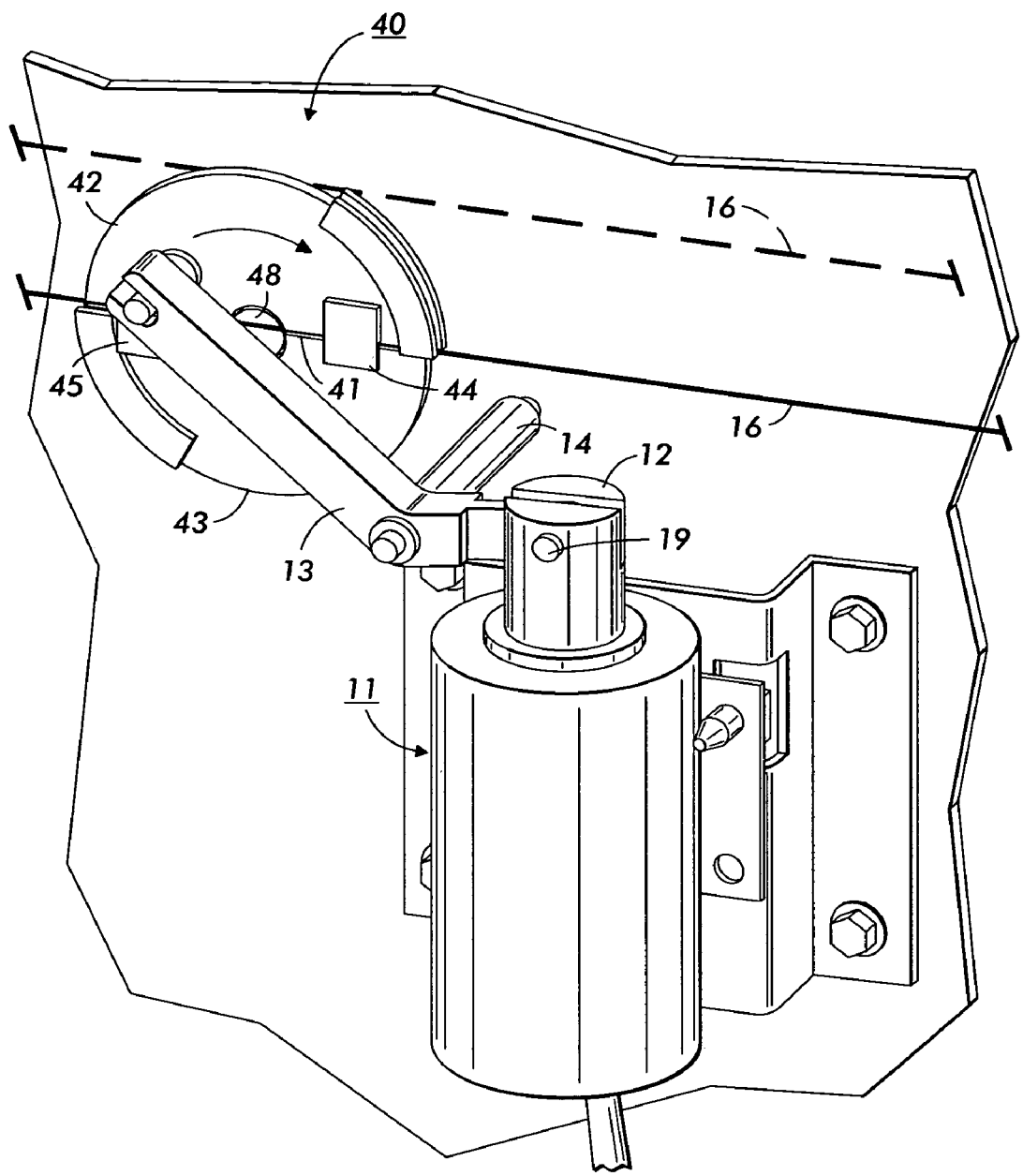
FIG. 4 is an elevated perspective view of one embodiment of the rotational cable shortening system of the present invention.

Referring now to FIG. 4, a closer perspective view of cable shortening apparatus 40 is shown. Solenoid 11, solenoid throw plunger 12, arm 13, cable 16, and pivot pin 14 are all similar in shape and function to the apparatus shown in FIG. 1. Cable engaging pulley 15, however, is replaced with a disk or other structure framing an elongated bridged channel 41 through which the cable is threaded. In the embodiment shown in FIG. 4, bridged channel 41 is framed by two semicircles 42 and 43 that form the "ceiling" and the "floor" of bridged channel 41. Semicircle members 42 and 43 are fastened into a disk by fasteners 44 and 45 and rotatably mounted on pin 48. Fasteners 44 and 45 frame a portion of the side-walls of the bridged channel and serve to keep cable 16 within bridged channel 41. As can be observed in FIGS. 3–5, bridged channel 41 framed by semicircles 42 and 43 and fasteners 44 and 45 need not form an enclosed tunnel. Rather, all that is required is members that frame bridged channel 41 such that the cable is forced to bend at the entrance and exit of bridged channel 41 when such channel is rotated. An attached loop guide forming a "bridge" proximate to at least one end of bridged channel 41 is all that is required. Such loop guide may comprise a simple hook attached to one side of the channel. As bridged channel 41 is rotated, a section of cable 16 would be deflected away from the main channel body and caught by the portion of the loop guide that is approximately 180 degrees from the main channel body.

Rotation of bridged channel 41 is accomplished in this embodiment using arm 13. Arm 13 attaches proximate to one end of bridged channel 41 away from solenoid 11. Prior to actuation of the system, the section of cable 16 running through bridged channel 41 remains essentially straight, or at rest. When solenoid throw plunger 12 is actuated, arm 13 causes bridged channel 41 to tilt into a different rotational orientation, thereby deflecting cable 16 into an S-bend path following the tilt of bridged channel 41. In this manner, the cable is effectively shortened, and force is applied to apparatus 50 to actuate tamper arms 51 and 52 (FIG. 2).

Figure 5:
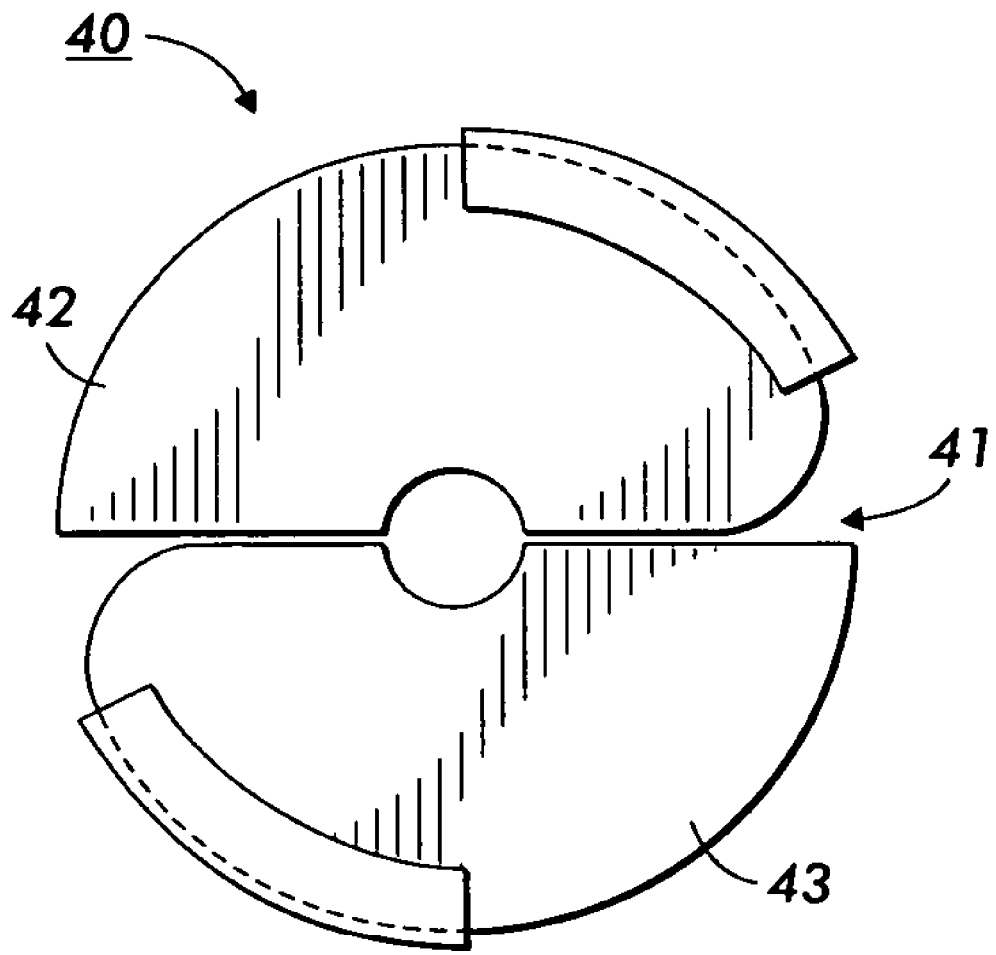
FIG. 5 is an elevated plane view of one embodiment of a rotating bridged channel component of the present invention.

A more detailed perspective view of semicircle disks 42 and 43 and bridged channel 41 is shown in FIG. 5. In this view, semicircular lead-in disk sections are curved away from the direction of ration at their entrance and exit points in order not to cut or abrade cable 16. The result is the "ying-yang" shape shown in FIG. 5 that provides an "S" shaped bridged channel 41. In addition to preventing or ameliorating abrasion of cable 16, another advantage of an "S" shaped bridged channel 41 is that the torque initially required to rotate the channel is less than that required as the degree of rotation increases. This roughly corresponds to the force profile of solenoid plunger 12, which builds in force as it draws in.

Among the advantages of the rotational cable shortening system shown in FIGS. 3–5 are the amount of cable length shortening that can be accomplished in a compact space. For instance, if solenoid plunger throw 12 has an 8 mm length of travel, bridged channel 41 is 2 inches long, and arm 13 is configured to rotate semicircle disks 42 and 43 approximately 90°, then cable 16 is shortened by about the length of bridged channel 41, or about 2 inches. Thus, in a compact space, an 8 mm throw has been leveraged into 2 inches, or approximately 50 mm. If arm 13 is configured to rotate disks 42 and 43 more than 90°, then the leveraging of distance increases even more for the rotation past 90°, since cable 16 begins wrapping itself around the circumference of disks 42 and 43. Thus, a rotational cable shortening system similar to the configuration in FIGS. 3–5 offers a compact and efficient means of shortening cable 16.

Another advantage of the present invention is that cable 16 can be threaded through bridged channel 41 without touching, or perhaps barely touching any surface until bridged channel 41 is rotated. Unlike the configuration in FIG. 2, cable 16 is not abraded or worn by the rotational shortening system of the invention.

Another advantage of the invention is its low weight and mass and the ability to remove the mass it does have from tamper assembly 50. If tamper arms 51 and 52 were powered by motors or solenoid assemblies, then the weight of such devices would be mounted with tamper assembly 50 on bar 56, which must be shifted to accommodate different size substrates. The result would be a requirement for a larger drive motor for shifting positions of tamper assembly 50 and bar 56, and such larger drive motor would require more current, create a larger load on the system power supply and would add significant cost. By using a cable shortening system, the need for mounting solenoids or motors on tamper assembly 50 is eliminated.

Compared to other cable shortening apparatus, another advantage of the invention is its low cost. Referring again to FIG. 1, pulley 15 is not desired because in order to benefit from its entire travel, it must touch and therefore abrade cable 16. Such abrasion may be ameliorated but not eliminated by using a pulley assembly that includes a pulley with bearings. Yet even this alternative costs considerably more than the configuration of the invention shown in FIGS. 2–5 with semicircle members 42 and 43 creating bridged channel 41.

Thus, the present invention offers a low cost, low-abrasion cable shortening system that is capable of rapid activations, significant shortening distances in a compact space, and successful transfer of the tamper drive mechanism away from the tamper assembly to be actuated that is mounted on a movable platform.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A finishing system for finishing substrate sheets, comprising:
   a. a substrate tray;
   b. a tamper assembly for tamping substrate sheets located in the tray;
   c. an actuating cable having a section disposed generally in one direction, said cable being connected to the tamper assembly wherein a pulling force from the cable actuates the tamping of substrate sheets; and
   d. a cable shortening subsystem for shortening the effective length of the actuating cable, said subsystem comprising a rotatably mounted bridged channel through which the cable is threaded in a rest orientation generally along the one direction and a mechanism, coupled to the bridged channel, for rotating the bridged channel, wherein rotation of the bridged channel to a second orientation shortens the effective cable length by deflecting a section of the cable away from the one direction, thereby exerting a pulling force upon the tamper assembly.

2. The finishing system of claim 1, wherein the rotatable bridged channel has a first and a second end and wherein the rotating mechanism comprises an arm connected to the rotatable bridged channel closer to the second end than to the first end.

3. The finishing system of claim 1, wherein the bridged channel has a first end at which the cable enters the tunnel and a second end at which the cable exits the tunnel and wherein regions of the bridged channel proximate to the first and second ends are curved away from the direction of rotation of the rotatable bridged channel.

4. The finishing system of claim 2, wherein the arm has an end connected to the rotatable bridged channel and wherein the rotating mechanism further comprises a solenoid in contact with a second end of the arm.

5. The finishing system of claim 4, wherein the arm is pivotally mounted around a pivot point between the end connected to the rotatable bridged channel and the second end.

6. The finishing system of claim 1, wherein the rotating bridged channel comprises two essentially semicircular halves coupled together and spaced apart to form essentially a disk with a bridged channel framed in the spaced apart midsection.

7. The finishing system of claim 6, wherein the semicircular halves are coupled together by fasteners that form side walls of the bridged channel.

8. The finishing system of claim 1, wherein the bridged channel comprises a groove having an end and a loop guide through which the cable is threaded, said loop guide being attached proximate to the end.

9. The finishing system of claim 1, wherein the bridged channel is rotatable at least 90 degrees.

10. The finishing system of claim 1, wherein the bridged channel member can be rotated from the rest position to the second position and back to the rest position in a cycle that can be completed in less than about 200 milliseconds.

11. The finishing system of claim 1, further comprising a series of pulleys for guiding the actuating cable from its connection to the tamper assembly to the cable shortening system.

12. The finishing system of claim 1, further comprising:
   a movable housing assembly to which the tamper assembly is mounted, said movable housing assembly having a cable attachment fixture separate from the connection of the cable to the tamper assembly; and
   a series of guides for guiding the actuating cable from its connection to the tamper assembly to the cable shortening system and then to the separate cable attachment fixture of the movable housing member, thereby forming a continuous loop comprised of the actuating cable, the movable housing member, and the tamper assembly;
   wherein, when the movable housing member is moved, sections of the actuating cable shift relative to the cable guides and to the cable shortening system.

13. The finishing system of claim 1, wherein the finishing system is integrated with an electrophotographic marking engine.

* * * * *